(12) United States Patent
Helmich et al.

(10) Patent No.: US 7,765,429 B2
(45) Date of Patent: *Jul. 27, 2010

(54) METHOD AND SYSTEM TO EXECUTE RECOVERY IN NON-HOMOGENOUS MULTI PROCESSOR ENVIRONMENTS

(75) Inventors: Ulrich Helmich, Boeblingen (DE); Andreas Kohler, Boeblingen (DE); Kenneth J. Oakes, Wappingers Falls, NY (US); Martin Taubert, Gaetringen (DE); John S. Trotter, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/360,283

(22) Filed: Jan. 27, 2009

(65) Prior Publication Data

US 2009/0138758 A1    May 28, 2009

Related U.S. Application Data

(63) Continuation of application No. 11/223,725, filed on Sep. 9, 2005, now Pat. No. 7,502,957.

(51) Int. Cl.
*G06F 11/00* (2006.01)
(52) U.S. Cl. ....................................................... 714/11
(58) Field of Classification Search ..................... 714/11
See application file for complete search history.

(56) References Cited

U.S. PATENT DOCUMENTS

| | | | | |
|---|---|---|---|---|
| 4,338,023 A | * | 7/1982 | McGibbon | 399/19 |
| 4,371,754 A | * | 2/1983 | De et al. | 714/10 |
| 4,742,447 A | | 5/1988 | Duvall et al. | |
| 4,823,256 A | * | 4/1989 | Bishop et al. | 714/10 |

(Continued)

FOREIGN PATENT DOCUMENTS

EP    0343646 A2    11/1989

(Continued)

OTHER PUBLICATIONS

Antoshenkov, et al., "Query Processing and Optimization in Oracle RdB", The VLDB Journal, Springer-Verlag, 1996; pp. 229-237.

*Primary Examiner*—Christopher S McCarthy
(74) *Attorney, Agent, or Firm*—Scully, Scott, Murphy & Presser, P.C.; Arthur Ortega, Esq.

(57) ABSTRACT

Disclosed are a method and system for parallel execution of recovery in a non-homogeneous multi-processor environment. The method defines criteria how to decide which recovery actions are to be performed, and on which processor. If multiple recovery actions are pending, the goal is to execute them in parallel on multiple processors. This is much more efficient than the traditional approach of one processor doing all the required recovery. In addition, in large, non-homogeneous systems such a single processor capable of doing the complete recovery might not be existing at all due to technical limitations. The method of this invention also defines rules and mechanisms how multiple processors executing recovery in parallel can access shared resources while avoiding deadlock situations. This includes accessing resources that are currently owned by another processor.

18 Claims, 3 Drawing Sheets

U.S. PATENT DOCUMENTS

| | | | |
|---|---|---|---|
| 5,339,408 A * | 8/1994 | Bruckert et al. | 714/11 |
| 5,590,281 A | 12/1996 | Stevens | |
| 5,634,037 A | 5/1997 | Sasaki et al. | |
| 5,761,413 A | 6/1998 | Frank et al. | |
| 5,764,882 A * | 6/1998 | Shingo | 714/11 |
| 5,768,572 A | 6/1998 | George et al. | |
| 5,796,937 A * | 8/1998 | Kizuka | 714/13 |
| 5,815,651 A * | 9/1998 | Litt | 714/10 |
| 5,842,208 A | 11/1998 | Blank et al. | |
| 5,983,359 A * | 11/1999 | Nota et al. | 714/10 |
| 6,014,756 A | 1/2000 | Dottling et al. | |
| 6,047,384 A | 4/2000 | Pühl et al. | |
| 6,199,179 B1 | 3/2001 | Kauffman et al. | |
| 6,301,676 B1 * | 10/2001 | Kumar et al. | 714/11 |
| 6,374,362 B1 * | 4/2002 | Ohtsu | 714/4 |
| 6,516,429 B1 * | 2/2003 | Bossen et al. | 714/47 |
| 6,557,099 B1 | 4/2003 | Takeda | 713/2 |
| 6,594,785 B1 * | 7/2003 | Gilbertson et al. | 714/48 |
| 6,625,749 B1 * | 9/2003 | Quach | 714/10 |
| 6,675,175 B2 | 1/2004 | Branch et al. | |
| 6,748,438 B2 | 6/2004 | Palmer et al. | |
| 6,757,769 B1 * | 6/2004 | Ofer | 710/200 |
| 6,823,472 B1 | 11/2004 | DeKoning et al. | |
| 6,826,656 B2 | 11/2004 | Augsburg et al. | |
| 6,834,385 B2 | 12/2004 | Bohm et al. | |
| 6,839,813 B2 | 1/2005 | Chauvel | |
| 6,842,825 B2 | 1/2005 | Geiner et al. | |
| 6,845,470 B2 | 1/2005 | Austen et al. | |
| 6,851,072 B2 | 2/2005 | Lasserre et al. | |
| 6,886,064 B2 | 4/2005 | Dawkins et al. | |
| 6,912,668 B1 * | 6/2005 | Brown et al. | 714/6 |
| 6,981,079 B2 * | 12/2005 | Dawkins et al. | 710/100 |
| 7,055,060 B2 * | 5/2006 | Nguyen et al. | 714/11 |
| 7,111,196 B2 * | 9/2006 | Balazich et al. | 714/13 |
| 7,124,224 B2 * | 10/2006 | Tu et al. | 710/200 |
| 7,137,028 B2 * | 11/2006 | Smith | 714/10 |
| 7,139,927 B2 * | 11/2006 | Park et al. | 714/4 |
| 7,343,515 B1 * | 3/2008 | Gilbertson et al. | 714/10 |
| 2002/0062459 A1 | 5/2002 | Lasserre et al. | |
| 2002/0069327 A1 | 6/2002 | Chauvel | |
| 2002/0116438 A1 * | 8/2002 | Tu et al. | 709/104 |
| 2002/0116469 A1 * | 8/2002 | Okuyama | 709/213 |
| 2003/0061537 A1 | 3/2003 | Cha et al. | |
| 2004/0006722 A1 * | 1/2004 | Safford | 714/11 |
| 2004/0123201 A1 * | 6/2004 | Nguyen et al. | 714/736 |
| 2004/0230865 A1 * | 11/2004 | Balazich et al. | 714/13 |
| 2004/0268062 A1 * | 12/2004 | Ofer | 711/152 |
| 2006/0136925 A1 * | 6/2006 | Tu et al. | 718/104 |

FOREIGN PATENT DOCUMENTS

WO    WO 03/045035 A2    5/2003

\* cited by examiner

FIG. 2

STRATEGIES FOR SCHEDULING / RECOVERY ACTIONS
1. IF RECOVERY ACTION CAN BE DONE BY ONLY ONE PROCESSOR, THEN USE THAT PROCESSOR
2. INTRODUCE AN ORDER IN WHICH MULTIPLE RESOURCES OF DIFERENT TYPES CAN BE OCCUPIED
3. IF MORE THAN ONE PROCESSOR CAN PERFORM RECOVERY ACTION:
    i. FIRST COME, FIRST SERVE,
    ii. ONE AT A TIME

FIG. 3

STRATEGIES FOR ACCESSING RESOURCES
1. ACCESS ONLY AS FEW AS POSSIBLE SHARED RESOURCES
2. ACCESS SHARED RESOURCES OWNED BY OTHER PROCESSORS
    - CAN BE DONE IF THE OTHER PROCESSOR IS IN A SECURE STATE WHERE IT DOES NOT ACCESS THE RESOURCE

METHOD AND SYSTEM TO EXECUTE RECOVERY IN NON-HOMOGENOUS MULTI PROCESSOR ENVIRONMENTS

CROSS REFERENCE TO RELATED APPLICATIONS

This application is a continuation of application Ser. No. 11/223,725, filed Sep. 9, 2005, now U.S. Pat. No. 7,502,957 the disclosure of which is hereby incorporated herein by reference in its entirety. This application is related to application Ser. No. 11/223,701, filed Sep. 9, 2005, now U.S. Pat. No. 7,457,905, issued Nov. 25, 2008 for "Method And System To Detect Errors In Computer Systems By Using State Tracking,"; application Ser. No. 11/223,711, filed Sep. 9, 2005 for "Method And System For State Tracking And Recovery In MultiProcessing Computing Systems,"; and application Ser. No. 11/223,877, filed Sep. 9, 2005 for "Method And System To Recover From Control Block Hangs In A Heterogeneous Multiprocessor Environment,". The disclosures of the above-identified applications are herein incorporated by reference in their entireties.

BACKGROUND OF THE INVENTION

1. Field of the Invention

The present invention in general relates to computer systems, and in particular, to multiprocessing computer systems. Even more specifically, the invention relates to methods and systems to execute recovery in non-homogeneous multi processor environments.

2. Background Art

Multiprocessor computer systems are becoming increasingly important in modern computing because combining multiple processors increases processing bandwidth and generally improves throughput, reliability and serviceability. Multiprocessing computing systems perform individual tasks using a plurality of processing elements, which may comprise multiple individual processors linked in a network, or a plurality of software processes or threads operating concurrently in a coordinated environment.

Many early multiprocessor systems were comprised of multiple, individual computer systems, referred to as partitioned systems. More recently, multiprocessor systems have been formed from one or more computer systems that are logically partitioned to behave as multiple independent computer systems. For example, a single system having eight processors might be configured to treat each of the eight processors (or multiple groups of one or more processors) as a separate system for processing purposes. Each of these "virtual" systems would have its own copy of an operating system, and may then be independently assigned tasks, or may operate together as a processing cluster, which provides for both high speed processing and improved reliability.

The International Business Machines Corporation zSeries servers have achieved widespread commercial success in multiprocessing computer systems. These servers provide the performance, scalability, and reliability required in "mission critical environments." These servers run corporate applications, such as enterprise resource planning (ERP), business intelligence (BI), and high performance e-business infrastructures. Proper operation of these systems can be critical to the operation of an organization and it is therefore of the highest importance that they operate efficiently and as error-free as possible, and rapid problem analysis and recovery from system errors is vital. It may be noted that logical partitioning on an IBM zSeries server means that the physical processors are virtualized. This means that the system can be configured to treat each of the virtual processors (or multiple groups of one or more virtual processors) as a separate system for processing purposes.

A large multiprocessor system, such as the IBM zSeries servers, maintains a large state space in data structures. Usually many of these structures are shared. Each task in the system modifies a (small) portion of the overall state. Such a task possibly can—due to a hardware or a code error—do an erroneous or incomplete modification of the state. This item of the state space may affect a single or multiple components of the system. In any case, an effective recovery actions is required to restore consistency.

The traditional approach is to first collect a system wide overview of the pending recovery actions to be performed. A single processor then executes the recovery, while the other affected ones are kept in a secure state. While this approach is suitable for small and homogeneous systems, it usually cannot be applied to large, non-homogeneous systems. There are two reasons for that:

A single processor would be required that is technically able to perform all recovery actions. However, in large systems, usually not all processors do have the same capabilities. A single processor capable to perform all possible kinds of recovery actions often does not exist.

Overall recovery execution time is a problem in large systems, since all processors affected by the error are unresponsive to outside requests while doing the recovery. Therefore parallel execution of recovery for the affected processors is required in order to keep the recovery execution time at a minimum.

SUMMARY OF THE INVENTION

An object of the present invention is to provide a method for parallel execution of recovery in a non-homogeneous multi-processor environment.

Another object of this invention is to provide a method and system, for use in a recovery process in a non-homogeneous multi-processor environment, that define criteria how to decide which recovery actions are to be performed, and which processor to use for the recovery actions.

A further object of the invention is to provide rules and mechanisms, for use in a recovery process in non-homogeneous multi-processor environments, how multiple processors executing recovery in parallel can access shared resources while avoiding deadlock situations.

These and other objectives are attained with a method and system for parallel execution of recovery in a non-homogeneous multi-processor environment. The method defines criteria how to decide which recovery actions are to be performed, and on which processor. If multiple recovery actions are pending, the goal is to execute them in parallel on multiple processors. This is much more efficient than the traditional approach of one processor doing all the required recovery. In addition, in large, non-homogeneous systems such a single processor capable of doing the complete recovery might not be existing at all due to technical limitations. The method of this invention also defines rules and mechanisms how multiple processors executing recovery in parallel can access shared resources while avoiding deadlock situations. This includes accessing resources that are currently owned by another processor.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 2 identifies various strategies that may be used for scheduling recovery actions, in accordance with the present invention, in a non-homogeneous multi-processor environment.

FIG. 3 identifies strategies, in accordance with this invention, for avoiding hangs and delays during recovery actions when resources are shared among processors.

DETAILED DESCRIPTION OF THE PREFERRED EMBODIMENTS

Figure 1:
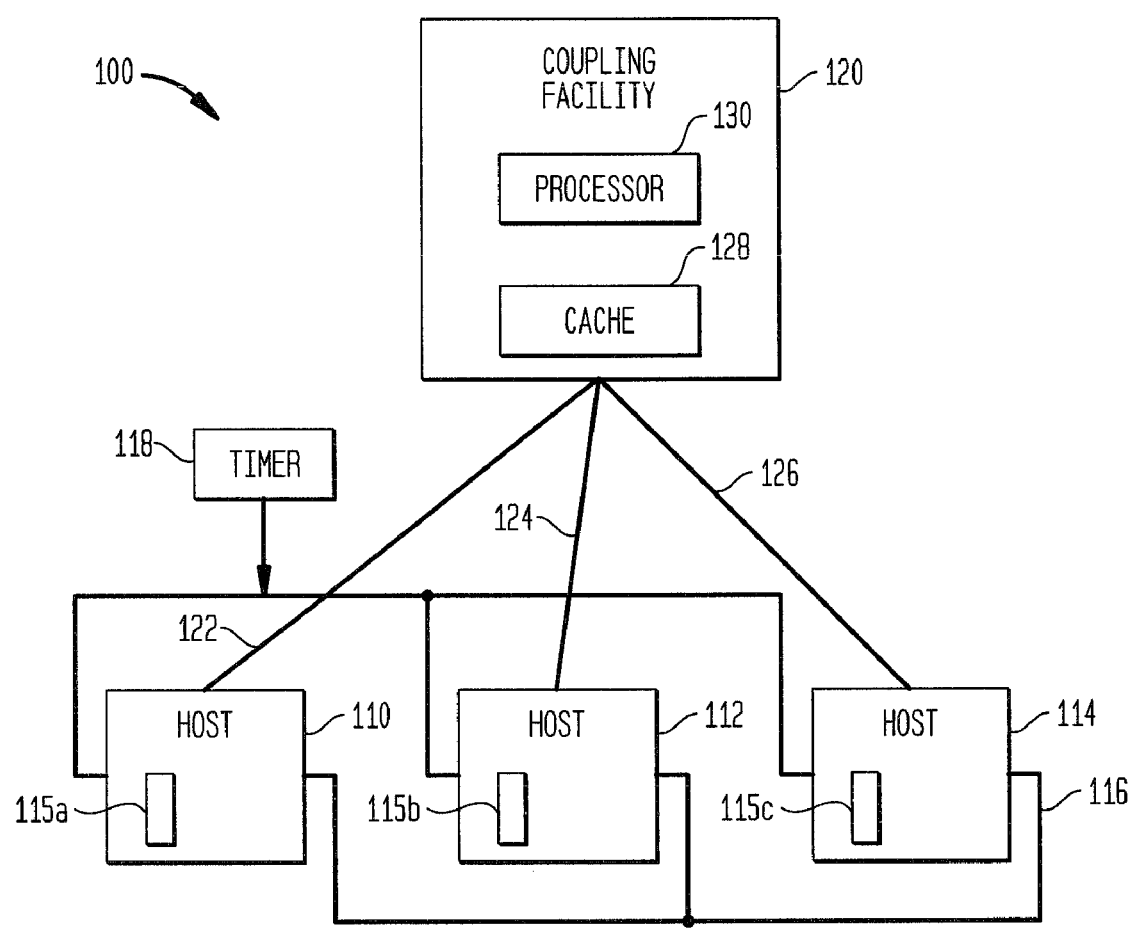
FIG. 1 illustrates a multi-processor computing system with which the present invention may be used.

FIG. 1 illustrates multiprocessor computer system 100 that generally comprises a plurality of host computers 110, 112, 114, which are also called "hosts". The hosts 110, 112, 114 are interconnected with host links 116, which may comprise, for example, Coupling Links, Internal Coupling Channels, an Integrated Cluster Bus, or other suitable links. Rather than using three hosts 110, 112, 114 as in the illustrated example, in alternative embodiments one, two, four, or more hosts may be used. System 100 also includes a timer 118 and a coupling facility 120.

Each host 110, 112, 114 itself is a multiprocessor system. Each host 110, 112, 114 may be implemented with the same type of digital processing unit (or not). In one specific example, the hosts 110, 112, 114 each comprise an IBM zSeries Parallel Sysplex server, such as a zSeries 900, running one or more of the z Operating System (z/OS). Another example of a suitable digital processing unit is an IBM S/390 server running OS/390. The hosts 110, 112, 114 run one or more application programs that generate data objects, which are stored external from or internal to one or more of the hosts 110, 112, 114. The data objects may comprise new data or updates to old data. The host application programs may include, for example, IMS and DB2. The hosts 110, 112, 114, run software that includes respective I/O routines 115a, 115b, 115c. It may be noted that other types of hosts may be used in system 100. In particular, hosts may comprise any suitable digital processing unit, for example, a mainframe computer, computer workstation, server computer, personal computer, supercomputer, microprocessor, or other suitable machine.

The system 100 also includes a timer 118 that is coupled to each of the hosts 110, 112, 114, to synchronize the timing of the hosts 110, 112, 114. In one example, the timer 118 is an IBM Sysplex®. Timer. Alternatively, a separate timer 118 may be omitted, in which case a timer in one of the hosts 110, 112, 114 is used to synchronize the timing of the hosts 110, 112, 114.

Coupling facility 120 is coupled to each of the hosts 110, 112, 114 by a respective connector 122, 124, 126. The connectors 122, 124, 126, may be, for example, Inter System Coupling (ISC), or Internal Coupling Bus (ICB) connectors. The coupling facility 120 includes a cache storage 128 ("cache") shared by the hosts 110, 112, 114, and also includes a processor 130. In one specific example, the coupling facility 120 is an IBM z900 model 100 Coupling Facility. Examples of other suitable coupling facilities include IBM model 9674 C04 and C05, and IBM model 9672 R06. Alternatively, the coupling facility 120 may be included in a server, such as one of the hosts 110, 112, 114.

As an example, some suitable servers for this alternative embodiment include IBM z900 and S/390 servers, which have an internal coupling facility or a logical partition functioning as a coupling facility. Alternatively, the coupling facility 120 may be implemented in any other suitable server. As an example, the processor 130 in the coupling facility 120 may run the z/OS. Alternatively, any suitable shared memory may be used instead of the coupling facility 120. The cache 128 is a host-level cache in that it is accessible by the hosts 110, 112, 114. The cache 128 is under the control of the hosts 110, 112, 114, and may even be included in one of the host machines if desired.

As mentioned above, a large multiprocessor system, such as the IBM zSeries servers, maintains a large state space in data structures. Usually many of these structures are shared. Each task in the system modifies a (small) portion of the overall state. Such a task possibly can—due to a hardware or a code error—do an erroneous or incomplete modification of the state. This item of the state space may affect a single or multiple components of the system. In any case, an effective recovery actions is required to restore consistency.

The traditional approach is to first collect a system wide overview of the pending recovery actions to be performed. A single processor then executes the recovery, while the other affected ones are kept in a secure state. While this approach is suitable for small and homogeneous systems, it usually cannot be applied to large, non-homogeneous systems. There are two reasons for that:

A single processor would be required that is technically able to perform all recovery actions. However, in large systems, usually not all processors do have the same capabilities. A single processor capable to perform all possible kinds of recovery actions often does not exist.

Overall recovery execution time is a problem in large systems, since all processors affected by the error are unresponsive to outside requests while doing the recovery. Therefore parallel execution of recovery for the affected processors is required in order to keep the recovery execution time at a minimum.

The present invention provides a method for parallel execution of recovery in a non-homogeneous multi-processor environment. There are two main aspects to this:

1. Scheduling of recovery actions: which processor executes which recovery
   i. actions?
2. Access to shared resources held by other processors Scheduling of Recovery Actions In a large system, some processors may not be able to perform a required recovery action due to technical limitations. This may be e.g. because they do not have access to the entire state space, or because they do not have access to a specific piece of hardware. Therefore it may even be required that for an error detected on one processor, other so far not affected processors having the required capabilities need to perform the recovery actions.

Errors that affect a shared resource often cause multiple processors to detect the situation within a small amount of time. It then needs to be decided which of the affected processors needs to perform which of the required recovery actions. One problem with that is that in the past, there was no way of quickly determining which portions of the state space were currently active (in the process of being modified). In case of an error, the entire state space had to be assumed to be inconsistent. As a result, a processor doing recovery had to do time consuming scans for activity in order to restore a consistent state space.

Accessing Shared Resources

In order to perform a recovery action for an error, a processor usually accesses several shared data structures. This provides two problems:

A shared data structure may have been in the process of being changed by a functional task running on a second processor that is also affected by the error. In some situations, this second processor is not able to just release the shared data structure. It now needs to be determined under which circumstances the processor executing the recovery is allowed to access the structure despite it currently being owned by another processor.

The serialization of concurrent accesses in large systems can lead to long overall recovery execution times.

The present invention addresses each of the above-discussed aspects of parallel execution of recovery in a non-homogeneous multi-processor environment.

1. Scheduling of Recovery Actions:

The method defines criteria how to decide which recovery actions are to be performed, and on which processor. If multiple recovery actions are pending, the goal is to execute them in parallel on multiple processors. This is much more efficient than the traditional approach of one processor doing all the required recovery. In addition, in large, non-homogeneous systems such a single processor capable of doing the complete recovery might not be existing at all due to technical limitations.

Access to Shared Resources Held by Other Processors:

The method defines rules and mechanisms how multiple processors executing recovery in parallel can access shared resources while avoiding deadlock situations. This includes accessing resources that are currently owned by another processor.

Each of these aspects of the invention is discussed below in more detail.

Scheduling of Recovery Actions

Recovering from an error can require multiple recovery actions to be executed. In the situation of an error affecting multiple processors this always is the case. For each of the individual actions, it needs to be decided which processor in the system should perform it. With reference to FIG. 2, a recovery action can involve a resource where only one specific processor is technically capable to do the recovery. Such a static assignment obviously uniquely defines which processor has to perform the recovery action. The recovery method triggers the appropriate processors to execute their portion of the recovery. In case there are any dependencies between individual recovery actions, the method also takes care that they get executed in the correct sequence.

If multiple processors technically can execute the recovery action, a dynamic scheduling scheme can be applied. After the appropriate processors have been signaled that a recovery is to be performed, there are two different possible strategies depending the nature of the specific action:

1. First Come, First Serve:

The first processor entering recovery executes all pending requests together at the same time. For the other processors that got signaled, nothing is left to do. This scheme is appropriate if multiple requests can be executed together on a single processor without (significantly) increasing the execution time compared to executing a single request.

One at a Time:

Every processor that enters recovery executes only one of the pending requests. This leads to multiple processors executing the requests in parallel. After a processor completes a recovery action, it checks if there are more requests pending. If yes, it executes another one. This scheme is appropriate if multiple requests cannot be executed together on a single processor without significantly increasing the execution time compared to executing a single request.

Accessing Shared Resources

Accessing and locking of multiple shared resources can result in deadlock situations or significant delays. This is especially true after an error occurred, and resources were locked before in the functional code path. During the recovery actions, at least these resources need to be accessed, too, but often in a different order than in the functional path. With reference to FIG. 3, avoiding hangs and delays in the recovery method is threefold:

1. Access Only as Few as Possible Shared Resources:

A task performed in a large system usually changes only a very limited amount of the overall state space. Using book-keeping mechanisms allows to maintain the current state of activity for the task within a small data structure (Task Control Block, TCB). At the regular end of the task, all modifications to the state space are in a consistent state and the TCB is empty, i.e. it shows no activity on the state space. At any given time, when a task fails (due to a hardware or a code bug), the TCB shows all items that are in the process of modification. For the recovery this allows to change the strategy from "scan to find what needs to be recovered" to a "look up what was in use" approach. This limits the number of shared resources that need to be accessed during recovery to the absolute minimum.

Introduce an Order in Which Multiple Resources of Different Types Can Be Occupied:

To avoid deadlock already by how the processors do occupy multiple resources, classify the resources into different types and define an order of types. When occupying multiple resources, each processor is allowed to lock at most one resource per type, and has to obey the defined sequence of resource types.

Access Shared Resources Owned by Other Processors:

Accesses to shared resources that are currently owned by another processor can be done if the other processor is in a secure state where it does not access the resource, and is prepared to later work with the resource although its state has changed. This may be done using any suitable definition of such secure processor states, resource access rules, and any appropriate query mechanisms.

Figure 4:
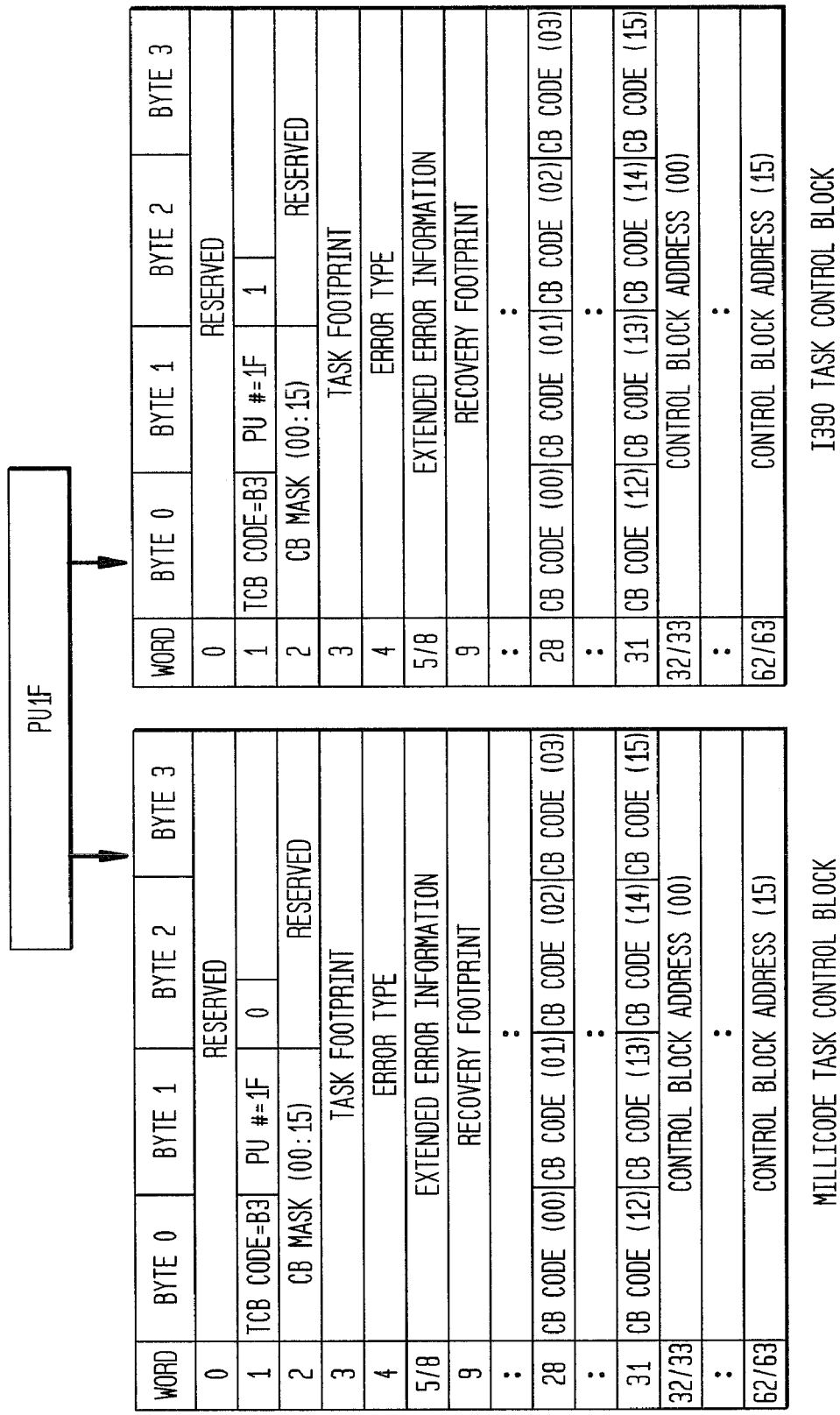
FIG. 4 shows a task control block that may be used in the preferred embodiment of the invention.

FIG. 4 shows a task control block (TCB) that may be used in the practice of the present invention. More specifically, preferably, each processing unit (PU) of the multiprocessor hosts 110, 112 and 114 is assigned at least one TCB, and the TCB will contain information about:

The data structures being used by a PU while executing a task.

PU task state footprint information.

If an error occurs the PU will store error type, error code, and extended error information in the TCB.

Each task running on the PU is assigned a TCB. For example, on the IBM zSeries servers, the PUs can execute in 2 modes, i390 mode or Millicode mode, thus when the present invention is implemented with such servers, there preferably will be 2 TCBs allocated for each PU. Defining unique TCBs per PU for I390 mode and Millicode mode allows greater interleaving of tasks that can occur when processors switch modes while processing functions by keeping the resources used separated. This structure is shown in FIG. 4.

Key TCB Field Definitions
1. TCB Code field 202: Unique static hexadecimal value to identify TCB control block type.
2. PU# field 204: Physical PU number owning the TCB.
3. Mode field 206: Identifier for Millicode or I390 mode
4. Control Block Slot Arrays: Three 16 element arrays that contain:
Control Block Mask (CBM) Array 212: A bit significant mask of valid flags for the fields in the CBC and CBA arrays.
Control Block Code (CBC) Array 214: Contains Control Block Code of the Control Block that was locked or being locked.
Control Block Address (CBA) Array 216: Contains Control Block Address of the Control Blocks that was lock or being locked.
Task Footprint field 220: Indicator of current task step executing on the PU
Error Code field 222: Unique Error data stored by failing task.
Extended Error Information field 224: Additional data stored by failing task to aid in recovery or problem debug.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of parallel execution of recovery in a multi-processor system including a plurality of processing units the method comprising the steps of:
scheduling a multitude of recovery actions, including the step of providing criteria to determine which recovery actions are to be performed and on which processing units;
providing access to shared resources, including the step of providing rules to determine how multiple processing units executing recovery in parallel can access shared resources; and
selecting and using a plurality of the processing units, according to said criteria and rules, to perform the scheduled recovery actions by distributing the multitude of recovery actions among said plurality of processing units, including assigning, based on said criteria, each of the plurality of processing units one or more of the multitude of recovery actions, and each of the plurality of processing units executing the one or more of the recovery actions assigned to said each processing unit.

2. A method according to claim 1, wherein:
the scheduling step includes the step of scheduling a set of the recovery actions; and
the selecting and using step includes the steps of
i) the selected processing units entering the recovery process at different times, and
ii) using a first of the processing units to enter the recovery process to execute all of said set of the recovery actions.

3. A method according to claim 1, wherein:
the selecting and using step further includes the steps of
i) the selected processing units entering the recovery process at different times, and
ii) as each of the selected processing units enters the recovery process, the processing unit executing one of said multitude of said recovery actions.

4. A method according to claim 3, wherein the selecting and using step includes the further step of, when one of the selected processing units completes one of the recovery actions, said one of the selected processing units executing another one of said multitude of recovery actions.

5. A method according to claim 1, wherein the multiprocessor system further includes a plurality of task control blocks, and the step of providing access to shared resources includes the steps of:
identifying in the task control blocks the resources being modified by the processing units; and
when one of the processing units fails, looking at the task control blocks to identify the resources being modified by said failing processing unit, to reduce the number of shared resources that need to be accessed during recovery.

6. A method according to claim 5, wherein for each of the processing units, an associated one of the task control blocks identifies all of the shared resources being modified by the processing unit.

7. A method of parallel execution of recovery in a multi-processor system including a plurality of processing units, the method comprising the steps of:
scheduling recovery actions, including the step of providing criteria to determine which recovery actions are to be performed and on which processing units;
providing access to shared resources, including the step of providing rules to determine how multiple processing units executing recovery in parallel can access shared resources;
selecting and using one or more of the processing units, according to said criteria and rules, to perform the scheduled recovery actions, the selectin and using step including using a first of the processing units to enter a recovery process to execute all of a scheduled set of recovery actions;
identifying an order in which multiple resources of different types can be occupied by the processing units, and wherein each of the processing units is allowed to lock at most one resource per type at a time.

8. A recovery system for parallel execution of recovery in a multi-processor system including a plurality of processing units, the recovery system comprising:
means for scheduling a multitude of recovery actions, including means for providing criteria to determine which recovery actions are to be performed and on which processing units;
means for providing access to shared resources, including means for providing rules to determine how multiple processing units executing recovery in parallel can access shared resources; and
means for selecting and using a plurality of the processing units, according to said criteria and rules, to perform the scheduled recovery actions by distributing the multitude of recovery actions among said plurality of processing units, including assigning, based on said criteria, each of the plurality of processing units one or more of the multitude of recovery actions, and each of the plurality of processing units executing the one or more of the recovery actions assigned to said each processing unit.

9. A recovery system according to claim 8, wherein:
the scheduling means includes means for scheduling a set of the recovery actions;
the selected processing units enter the recovery process at different times, and
the means for selecting and using includes
means for using a first of the processing units to enter the recovery process to execute all of said set of recovery actions.

10. A recovery system according to claim 8, wherein:
the selected processing units enter the recovery process at different times; and
the means for selecting and using includes
means for operating the selected processing units wherein, as each of the selected processing units enters the recovery process, the processing unit executes one of said multitude of said recovery actions.

11. A recovery system according to claim 10, wherein the means for selecting and using further includes means for operating the selected processing units wherein, when one of the selected processing units completes one of the recovery actions, said one of the selected processing units executes another one of said multitude of recovery actions.

12. A recovery system according to claim 8, wherein the multiprocessor system further includes a plurality of task control blocks, and the means for providing access to shared resources includes:
means for identifying in the task control blocks the resources being modified by the processing units; and
means for looking at the task control blocks when one of the processing units fails, to identify the resources being modified by said failing processing unit, to reduce the number of shared resources that need to be accessed during recovery.

13. A recovery system according to claim 12, wherein for each of the processing units, an associated one of the task control blocks identifies all of the shared resources being modified by the processing unit.

14. A program storage device readable by machine, tangibly embodying a program of instructions executable by the machine to perform method steps for parallel execution of recovery in a multi-processor system including a plurality of processing units, said method steps comprising:
scheduling a multitude of recovery actions, including the step of providing criteria to determine which recovery actions are to be performed and on which processing units;
providing access to shared resources, including the step of providing rules to determine how multiple processing units executing recovery in parallel can access shared resources; and
selecting and using a plurality of the processing units, according to said criteria and rules, to perform the scheduled recovery actions by distributing the multitude of recovery actions among said plurality of processing units, including assigning, based on said criteria, each of the plurality of processing units one or more of the multitude of recovery actions, and each of the plurality of processing units executing the one o more of the recovery actions assigned to said each processing unit.

15. A program storage device according to claim 14, wherein:
the scheduling step includes the step of scheduling a set of the recovery actions; and
the selecting and using step includes the steps of
i) the selected processing units entering the recovery process at different times, and
ii) using a first of the processing units to enter the recovery process to execute all of said set of the recovery actions.

16. A program storage device according to claim 14, wherein:
the selecting and using step includes the steps of
i) the selected processing units entering the recovery process at different times, and
ii) as each of the selected processing units enters the recovery process, the processing unit executing one of said multitude of said recovery actions.

17. A program storage device according to claim 16, wherein the selecting and using step includes the further step of, when one of the selected processing units completes one of the recovery actions, said one of the selected processing units executing another one of said multitude of recovery actions.

18. A program storage device according to claim 14, wherein the multiprocessor system further includes a plurality of task control blocks, and the step of providing access to shared resources includes the steps of:
identifying in the task control blocks the resources being modified by the processing units; and
when one of the processing units fails, looking at the task control blocks to identify the resources being modified by said failing processing unit, to reduce the number of shared resources that need to be accessed during recovery.

* * * * *